Nov. 3, 1964 J. Z. PAYSEN ETAL 3,155,345
AIRCRAFT NOSE GEAR TOW MEANS FOR CATAPULT LAUNCHING
Filed Sept. 26, 1962 3 Sheets-Sheet 1
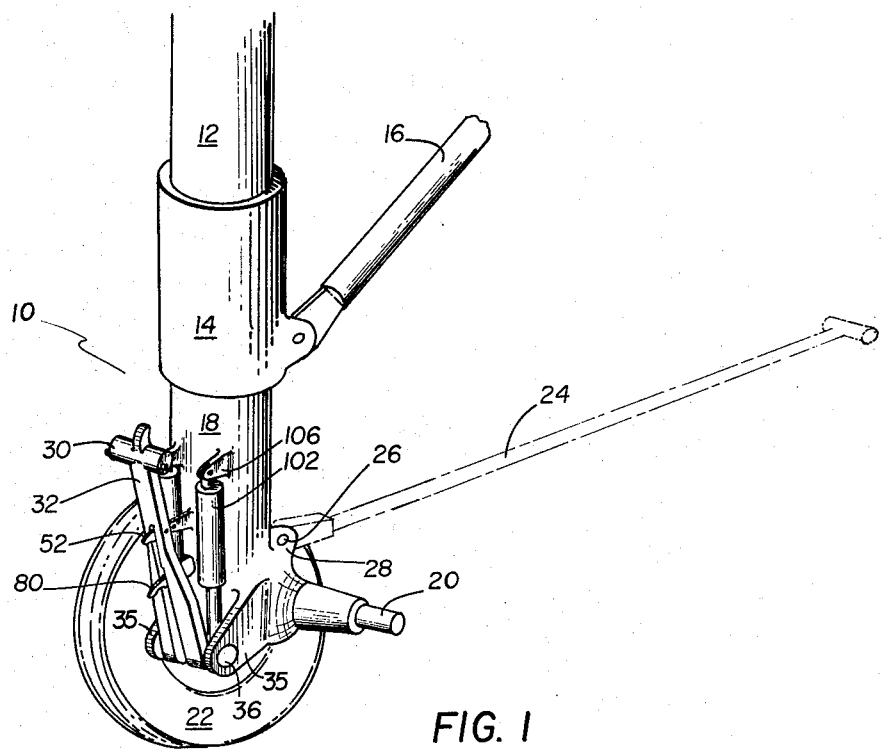
FIG. 1
INVENTOR.
JAMES Z. PAYSEN
GEORGE T. TRIFONOFF
BY
ATTORNEY Nov. 3, 1964  J. Z. PAYSEN ETAL  3,155,345
AIRCRAFT NOSE GEAR TOW MEANS FOR CATAPULT LAUNCHING
Filed Sept. 26, 1962  3 Sheets-Sheet 2

INVENTOR.
JAMES Z. PAYSEN
GEORGE T. TRIFONOFF
BY
ATTORNEY 3,155,345
AIRCRAFT NOSE GEAR TOW MEANS FOR
CATAPULT LAUNCHING
James Z. Paysen and George T. Trifonoff, Wichita, Kans.,
assignors to The Boeing Company, Wichita, Kans., a
corporation of Delaware
Filed Sept. 26, 1962, Ser. No. 226,263
9 Claims. (Cl. 244—63)

This invention concerns an improved tow assembly for aircraft nose gear in catapult launching. The structure includes: a tow bar stowed in an upper retracted position alongside the nose gear strut; means for unlatching the tow bar to lower it to a lower tow position to be tensed between the catapult shuttle and a hold-back bar; upon tensing the mechanism being automatically cocked, for retraction of the tow bar to its upper position when the hold-back bar releases and the aircraft is launched by the catapult shuttle, thereby freeing the tow bar from the shuttle.

Catapult launching is a critical operation in naval carrier operation in which the catapulting operation should take minimum time and have minimum opportunities for faulty operation, which would result in delay or even unsuccessful launching. It is desirable that the tow bar be freely pivotal until engaged by the catapult shuttle and yet have positive means for retraction upon catapulting with minimum chance of faulty retraction. Preferably, visual indication of retraction readiness would be provided.

The objects of our invention include: to provide an aircraft nose gear tow bar retraction mechanism that is simple and uncomplicated to avoid confusion in operational sequences and to avoid imperfect operation; to provide a mechanism wherein the energy for tow bar retraction is not stored until the hold-back bar is in place and the catapult shuttle tenses the tow arm; to provide visual indications both for the uncocked condition and for the cocked condition; and to generally provide an aircraft nose gear tow mechanism for catapult launching which is reliable, simple, and of low cost and weight, and which otherwise will be suitable for use particularly in naval carrier conditions.

The invention will be understood, together with additional objectives and advantages thereof, from the following description, read with reference to the drawings, in which:

FIGURE 1 is a perspective view of a nose gear catapult launching system forming a specific embodiment of my invention, the view having one wheel broken away to better show the operating mechanism, the tow bar being in retracted position and the hold-back bar being shown.

FIGURE 5 is a view of the pivotal mounting of the tow bar to the nose gear structure, as viewed from below and partly in section.

The present invention does not change in any way the conventional and present day construction of nose gear (other than the tow bar assembly), hold-back means, catapult and catapult shuttle, or that portion of the tow bar engaging the shuttle. Portions of the shuttle, hold-back mechanism and nose gear not shown or described or only summarily treated can be taken as being conventional structures such as presently are in use and are shown in publications and patents, such as Patent 2,942,805.

Figure 2:
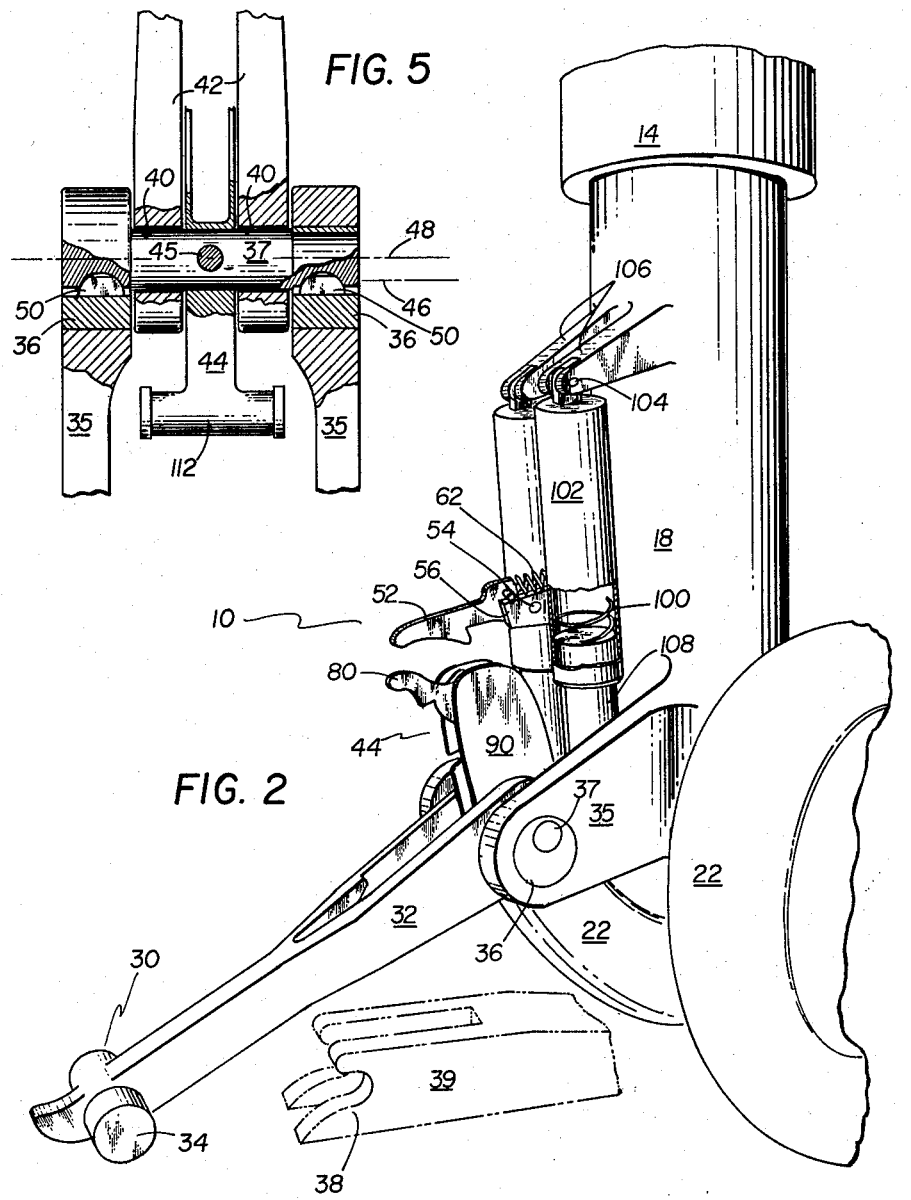
FIGURE 2 is an enlarged perspective view showing the mechanism with the tow bar lowered in position to be engaged by the catapult shuttle.

To briefly describe these structures, FIGURES 1 and 2 show nose gear assembly 10 including the upper strut portion 12, oleo 14, brace 16, lower strut portion 18, axle means 20, and wheels 22.

The hold-back mechanism includes the hold-back bar 24 having a shear pin type release separating when the catapult shuttle applies sufficient force to the tow bar. It may be taken for the purpose of this description that the shearing is accomplished at the pin 26 which attaches the hold-back bar to lugs 28 on the lower strut 18. However, the particular construction of the hold-back structure is immaterial to the invention and may take other forms, such as that shown in Patent 2,942,805. The T-shaped portion 30 at the end of tow bar 32 may be of any suitable construction, such as is shown in the Patent 2,942,805, and is shown here to have suitable camming surfaces for riding on the deck or the catapult guide rails during movement of the aircraft into such position that lugs 34 can be engaged with the claw-like hook 38 of catapult shuttle 39, FIGURE 2.

Turning now to the novel structure of the present invention, tow bar 32 is pivotally mounted for movement between the FIGURE 1 upper retracted and the FIGURE 2 lower tow positions. The pivotal mounting means includes a pair of anchor lugs 35 on lower strut 18 and a pair of eccentric spools 36 rotatably mounted in lugs 35 and secured to a pivot shaft 37 which extends through openings 40 in the bifurcated end 42 of tow bar 32. The tow bar is not keyed to pivot shaft 37 and only becomes latched thereto by means of a locking arm 44, as will be hereinafter described. The locking arm is secured to shaft 37 by pin 45. Lubrication or bearing means between the relatively pivotally movable members is not shown as friction is not much of a problem, partly because of the infrequent operation of the system, and suitable antifrictional means are a matter of routine design. It will be observed that the turning axis of the eccentric spools 36 in anchor lugs 35 is at 46 and the axis of pivot shaft 37 in eccentric spools 36 is at 48, whereby an eccentric type operation may be achieved, as will be hereinafter described. Pivot shaft 37 is locked to eccentric spools 36 by keys 50.

Figure 4:
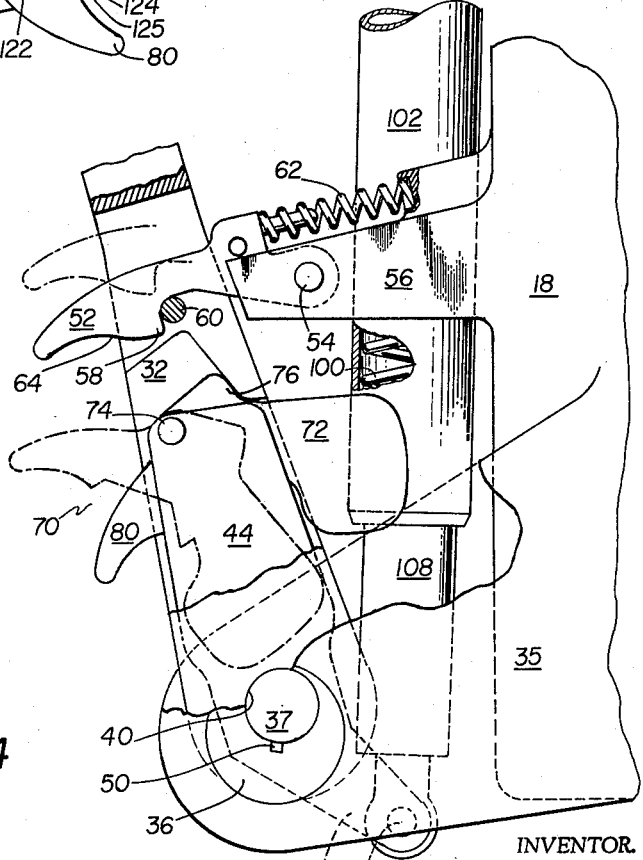
FIGURE 4 is a view of portions of the tow bar and associated structure, shown in elevation and partly in section, the full line positions of the latching mechanisms showing latched conditions and the dotted line positions showing unlatched conditions.

Tow bar 32 is latched in upper position by latch 52 pivotally connected by pin 54 to a lug 56 on lower strut 18 and having a hook 58 engaging a latch pin 60 on tow bar 32, FIGURE 4. The latch is pivoted toward latched position by compression spring 62. The tow bar is latched, as it moves to its upper position, by pin 60 bearing on camming surface 64 until it reaches a position to be engaged by hook 58. To release the tow bar 32, to lower it to the FIGURE 2 position for engagement with shuttle 39, the operator first manually releases latch 52.

Figure 3:
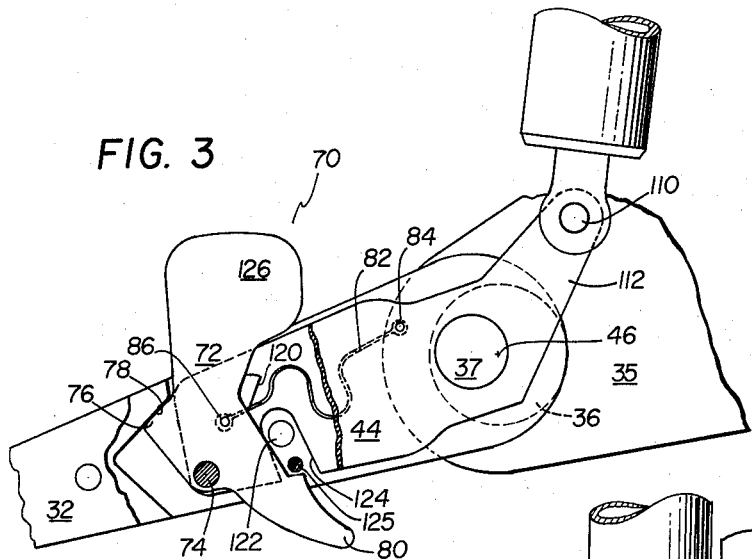
FIGURE 3 is an enlarged elevational view of portions of the tow bar and the retraction mechanism therefor, parts thereof being shown in section.

Tow bar 32 after release of latch 52 is still retained in upper position by latching means 70 on locking arm 44, which is shown in its upper latched condition in FIGURE 1 and in the full lines in FIGURE 4. A latch piece 72 is pivoted on a pivot pin 74 mounted in locking arm 44. Latch piece 72 has an abutment 76 which abuts a surface 78 on tow bar 32, FIGURE 3, thereby holding the tow bar in the upper retracted position of FIGURE 4 until released by manual lifting of the trigger arm 80 on latch piece 72, against the force of a compression spring 82. The spring is pinned to locking arm 44 at 84 and to latch piece 72 at 86. (Although FIGURE 3 shows the down position of the tow bar, it is illustrative of the latched relationships above described in the retracted FIGURE 1 position.) Upon such manual release of latch piece 72, tow bar 32 is free to fall or to be lowered from the FIGURE 1 position to the FIGURE 2 position. Note that locking arm 44 remains in its FIGURE 4 position at this point. In this condition the tow bar 32 is not cocked for automatic retraction and this fact is signaled by the exposed surfaces such as 90 of locking arm 44 being painted red, FIGURE 2.

The FIGURE 2 uncocked condition is maintained as the nose gear is brought into position (with the end 30 of tow bar 32 camming on the deck and the catapult guide ways) for the hold-back bar 24 to be restrained and for the T-shaped end 30 of the launch bar to be engaged by the claw-like hook 38 of catapult shuttle 39. It is only when these parts are properly located and the catapult shuttle 39 applies an initial tensing action on tow bar 32 (whereby the nose gear is tensed between the hold-back bar and the tow bar), that the cocking action occurs.

Before cocking, the locking arm 44 is being held in upper, upright position by the force of compression springs 100 acting between cylindrical housings 102 (pivotally attached by pins 104 to lugs 106 on lower strut 18) and pistons 108, which are connected by pins 110 to the T-shaped end 112 of locking arm 44, FIGURE 5. What must be accomplished in order for the tow bar 32 to be cocked for automatic retraction is for the parts to assume the FIGURE 3 position in which surfaces 76, 78 on latch piece and tow bar are engaged, which means that springs 100 must be compressed as locking arm 44 moves from the FIGURE 2 to the FIGURE 3 position.

As the catapult applies tension between the end of tow bar 32 and hold-back bar 24 (which is accomplished as a part of take-off readiness), force is created tending to move the center of pivot shaft 37 from the FIGURE 4 to the FIGURE 3 position, whereby eccentric spools 36 turn in lugs 35. In other words, tension is applied between tow bar 32 (acting on pivot shaft 37 through the walls of openings 40) and anchor lugs 35 (acting on eccentric spools 36), and this very sizable force will move pivot shaft 37 from the FIGURE 4 to the FIGURE 3 position. As pivot shaft 37 is keyed to eccentric spools 36, the rotation of the spools turns pivot shaft 37, and locking arm 44 pinned to the pivot shaft is pivoted from the FIGURE 2 to the FIGURE 3 position. The T-end 112 of locking arm 44 pivots to move pistons 108 upwardly compressing springs 100 (thereby storing energy for tow bar retraction).

As locking arm 44 pivots relative to launch bar 32 (and relative to the vertical) from the FIGURE 2 to the FIGURE 3 position, camming surface 120 on latch piece 72 strikes abutment pin 122 in tow bar 32 (received in a cut-out 124 in locking arm 44). Point 84 at one end of compression spring 82 and the point 86 at the other end have a toggle relationship. Abutment pin 122 acts on camming surface 120 to bring the line between points 84 and 86 over center relative to pivot pin 74 for the latch piece 72, whereupon the latch piece 72 snaps into the FIGURE 3 position thereby latching the tow bar 32 in cocked condition by the abutment of surfaces 76–78. Stop pin 125 prevents trigger arm 80 from over-travel in the locking action just described.

The exposed flag end 126 of latch piece 72 is painted green for signaling, when exposed, the retraction readiness or cocked condition of the mechanism. It will be observed in the FIGURE 3 position that once tow arm 32 is released from the catapult, compression springs 100 (acting through pistons 108, pin 110, and the T-end of locking arm 44) will pivot tow bar 32 back into the FIGURE 4 position in which latch 52 will engage pin 60.

To briefly review the operation described above, a deck crewman attaches a hold-back bar 24 to the nose gear prior to movement of the aircraft to launch position. Hold-back bar 24 has a shear pin 26 which will allow separation of the nose gear strut and the bar when a selected tensile load is exceeded. The tow launch bar 32 is manually released from its retracted FIGURE 1 position by the crewman pulling upward on lever 52 and trigger 80. The tow bar can then be lowered to the deck.

As the aircraft moves to launch position, the lower end 30 of the tow bar enters the catapult ramp structure and is guided into position for the hold-back bar to be secured. At this point the end of tow bar 32 is also in position to be engaged by the claw-like hook 38 of catapult shuttle 39. The fact that the tow bar is not ready for retraction is indicated by the red exposed surfaces 90 of locking bar 44.

Initial forward movement of the catapult acts on tow bar 32 to tense the tow bar mechanism between tow and hold-back bars. The tension automatically moves locking arm 44 down into latched, cocked condition against the action of retraction springs 100. Retraction readiness is signaled by the disappearance of the red surfaces 90 on locking arm 44 and the appearance of green flag surfaces 126 on latch piece 72.

When the catapulting force is applied, the force of the catapult exceeds the break-away strength of the shear pin in the hold-back bar and the hold-back bar separates from the nose gear freeing the aircraft. The catapult shuttle acting on the tow bar, together with the aircraft engines, accelerates the airplane down the deck (before the launch signal, throttles have been advanced on the aircraft engines, the airplane being restrained by the hold-back bar). At the end of the launch stroke, tow bar 32 disengages from shuttle 39 and is immediately flipped upward by the action of compression springs 100. At the end of upward movement of the tow bar, pin 60 is caught by latch 52 and the action of compression springs 100 acting through locking arm 44 also acts to hold the tow bar in upper retracted position.

Having thus specifically described our invention, we do not wish to be understood as limiting ourselves to the precise details of construction shown, but instead wish to cover those modifications thereof that will occur to those skilled in the art from our disclosure and that fairly fall within the scope of our invention, as described in the following claims.

We claim:

1. The improvement in tow means attached to an aircraft nose gear strut including a tow bar having an end engageable by a catapult shuttle, the strut having a hold-back bar attached thereto adapted to release the strut when catapult force applied through the tow bar exceeds a selected level, comprising:

an horizontal pivot shaft on which said tow bar is mounted for movement between a lower tow position and an upper retracted position alongside said strut;

a turnable member turnably supported on said strut and secured to said pivot shaft with its turning axis spaced from the axis of said pivot shaft whereby said turnable member and pivot shaft have an eccentric relationship;

a locking arm secured to said pivot shaft and spring means between said locking arm and said strut normally urging said arm to an upper position alongside said strut;

latching means on said locking arm operable automatically to latch said locking arm to said tow bar when they are relatively pivoted to a position alongside each other;

said pivot shaft having an upper position relative to the axis of said turnable member so that when said pivot shaft is pulled by said catapult shuttle, against the restraint on said strut of said hold-back bar, said turnable member is turned and said pivot shaft is turned thereby pivoting said locking arm from said upper position to a lower position alongside tow bar resulting in latching of said locking arm to said tow bar, whereby upon release of said tow bar by said shuttle during catapulting said spring acts on said tow bar through said locking arm to move said tow bar to said upper retracted position;

said latching means being manually operable to release said tow bar from said locking arm so that said tow bar may be lowered from said upper retracted position to said lower tow position for initial engagement with said catapult shuttle.

2. The subject matter of claim 1 in which there is second latch means on said strut automatically latching said tow bar when it moves from tow to retracted position, said second latch means being manually releasable to permit lowering of said tow bar from retracted to tow position.

3. The subject matter of claim 1 in which surfaces of said locking arm only exposed when said locking arm is not latched to said tow bar are painted a first color to indicate the tow bar is not in condition for automatic retraction, and in which surfaces of said latching means only exposed when said locking arm is latched to said tow bar are painted a second color, different from said first color, to indicate the tow bar is in condition for automatic retraction.

4. The improvement in tow means attached to an aircraft nose gear strut including a tow bar having an end engageable by a catapult shuttle, the strut having a hold-back means attached thereto adapted to release the strut when catapult force applied through the tow bar exceeds a selected level, comprising:

a turnable member turnably supported on said strut having means pivotally supporting said tow bar for pivoting about an axis spaced from the axis of said turnable member, between a lower tow position and an upper retracted position alongside said strut;

a locking arm mounted to pivot with said turnable member and spring means between said locking arm and said strut normally urging said arm to an upper position alongside said strut;

latching means on said locking arm automatically operable to latch said locking arm to said tow bar when relatively pivoted to a position alongside each other;

said turnable member having such normal radial position when biased by said spring means acting through said locking arm that when pulled by said tow bar as said catapult shuttle is operated, against the restraint on said strut of said hold-back means, said turnable member is turned thereby pivoting said locking arm from said upper position to a lower position alongside said tow bar resulting in latching of said locking arm to said tow bar, whereby upon release of said tow bar by said shuttle during catapulting said spring acts on said tow bar through said locking arm to move said tow bar to said upper retracted position.

5. The improvement in tow means attached to an aircraft gear strut including a tow bar having an end engageable by a catapult shuttle, the strut having hold-back means attached thereto adapted to release the strut when catapult force applied through the tow bar exceeds a selected level, comprising:

means pivotally mounting said tow bar on said strut to pivot between a lower tow position and an upper retracted position alongside said strut;

retraction means pivotally supported on said strut having automatic latch means operable to latch said retraction means to said tow bar and a spring acting on said retraction means normally pivoting the same in a direction which would bias said tow bar toward the retracted position when latched to said retraction means; and cocking means operable to pivot said retraction means in an opposite direction to said first-mentioned direction under force applied by the catapult shuttle to said tow bar against the restraint of said hold-back means and into position to become latched to said tow bar in its tow position, whereby upon release of said tow bar by said shuttle said retraction means will retract said tow bar.

6. The subject matter of claim 5 in which there is visible means signaling the uncocked and the cocked conditions of said retraction means.

7. The improvement in tow means attached to an aircraft gear strut including a tow bar having an end engageable by a catapult shuttle, the strut having hold-back means attached thereto adapted to release the strut when catapult force applied through the tow bar exceeds a selected level, comprising:

means mounting said tow bar to move from a lower tow position to an upper retracted position alongside said strut;

retraction means having a cocked condition in which it is exclusively operable to move said tow bar from said tow position to said retracted position; and cocking means operable to cock said retraction means in said cocked condition for permitting retraction of said tow bar upon catapulting.

8. The subject matter of claim 7 in which said cocking means is operated by force applied thereto by said tow bar when said tow bar is tensed between said shuttle and said hold-back means, whereby movement of said shuttle is operable to produce a cocked condition in said retraction means.

9. The subject matter of claim 7 in which said retraction means has visible signaling means for signaling cocked and uncocked conditions.

References Cited in the file of this patent

UNITED STATES PATENTS

| | | |
|---|---|---|
| 2,942,805 | Zimnoch | June 28, 1960 |
| 2,990,143 | Jamison | June 27, 1961 |
| 3,001,742 | Fosness | Sept. 26, 1961 |